Feb. 4, 1964 G. W. MOODY 3,120,421
DEVICE TO MEASURE AND RECORD VELOCITIES OF MOVING VEHICLES
Filed March 20, 1961 2 Sheets-Sheet 1

INVENTOR.
GEORGE W. MOODY
BY
ATTORNEYS

Feb. 4, 1964            G. W. MOODY            3,120,421

DEVICE TO MEASURE AND RECORD VELOCITIES OF MOVING VEHICLES

Filed March 20. 1961            2 Sheets-Sheet 2

INVENTOR.
GEORGE W. MOODY
BY
ATTORNEYS 3,120,421
DEVICE TO MEASURE AND RECORD VELOCITIES
OF MOVING VEHICLES
George W. Moody, 4908 Lyncott Drive, Lansing, Mich.
Filed Mar. 20, 1961, Ser. No. 97,013
6 Claims. (Cl. 346—107)

This invention concerns speed measuring devices, and more particularly a device by which the speed of a vehicle may be accurately determined and recorded from a pursuing vehicle traveling at a different velocity.

Radar and sonar devices are presently marketed and used which indicate with precision when a vehicle is exceeding posted limits. These devices also provide the summoning officer with court-recognized graphic records to substantiate his complaint.

In general, however, such devices have several deficiencies which limit their use. They are sufficiently expensive to limit their use to larger police departments and then in small numbers. They are bulky, cumbersome to handle, and some popular models must be operated from a stationary location (usually a parked car) which requires—in addition to the operator—an officer in a patrol car to apprehend the violator. Mobile models, in addition to their expense, require the use of considerable space in a car and require that an operator have some special training.

The present invention solves this problem by providing a camera which can be mounted on the dashboard of a police car and triggered by the driver to take a series of pictures of the road ahead of the police car at accurately timed intervals. The camera contains a mechanism coupled to the police car's speedometer by which an indication of the velocity of the police car is superimposed upon the picture of the road ahead without obscuring any part thereof. In addition, the camera automatically records on each picture a gridwork of lines whose spacing is constant and accurately determinable. With this spacing as a reference unit, the relative size of a pursued car in two or more successive pictures can be accurately measured, and if the actual height of the car is then determined from the manufacturer's specifications, its speed with respect to the police car can be accurately computed with the aid of simple mathematical formulae whenever legal proof of speed is required.

It is the object of this invention to provide a device sufficiently economical to allow its use in any desired patrol car, sufficiently simple to install so that it may be installed or removed in a matter of minutes with only minor alterations of the vehicle, sufficiently simple to operate so that no special or technical training is required, sufficiently small so that its use will in no way limit the vehicle's value or space, sufficiently accurate to fulfill its primary purpose, and sufficiently portable to allow it to be used without interfering in any way with normal patrol activities.

The operation of the invention will best be understood from the following specification, taken in conjunction with the attached drawings in which.

Basically, the device of this invention consists of a camera which can be mounted on the dashboard of a car and is equipped with a timer which causes the camera to take a predetermined number of individual pictures at accurately spaced time intervals upon triggering of the mechanism by an operator. A substantially transparent indicating device is mounted within the camera and in the camera's optical path in such a manner that a sharp picture of the indication of the indicating device is superimposed upon the picture of the road. This indicating device is operationally connected (preferably by electrical means) to the speedometer of the car in which the camera is mounted, so that an indication of the velocity of the camera at the moment any one picture is taken automatically appears superimposed upon that picture. The substantially transparent indicator may also be provided with a grid of thin opaque lines which, inasmuch as they are fixed with respect to the optical system of the camera, provides a standard comparison distance or measuring unit with respect to which the size of the image of a car can be ascertained for use in the computations by which its speed can be determined.

Figure 1:
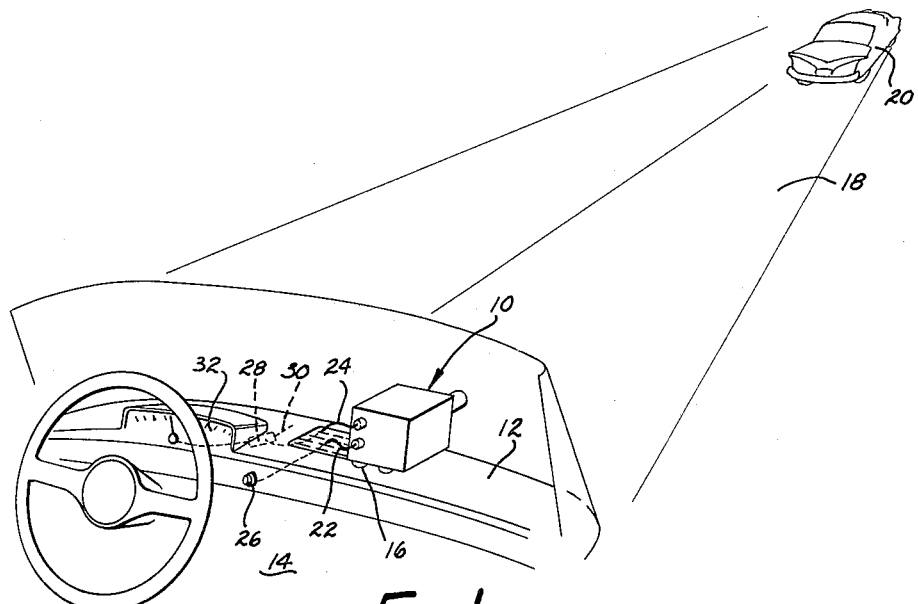
FIG. 1 is a perspective view of the manner in which the apparatus of this invention could be mounted on a police car dashboard.

Referring now to FIG. 1, the camera of this invention is generally shown at 10. The camera 10 is mounted on the dashboard 12 of a police car 14, preferably by resilient mounts 16. The camera 10 is so oriented as to include in its field the road 18 ahead of the police car and any cars, such as subject car 20, thereon. Electrical connections 22 and 24 lead from the camera 10 to the actuator button 26 and to a small generator 28 connected into the drive cable 30 of the police car's speedometer 32. It should be understood that the use of the generator 28 does not in any way impair the operation and accuracy of the dashboard speedometer 32.

Figure 2:
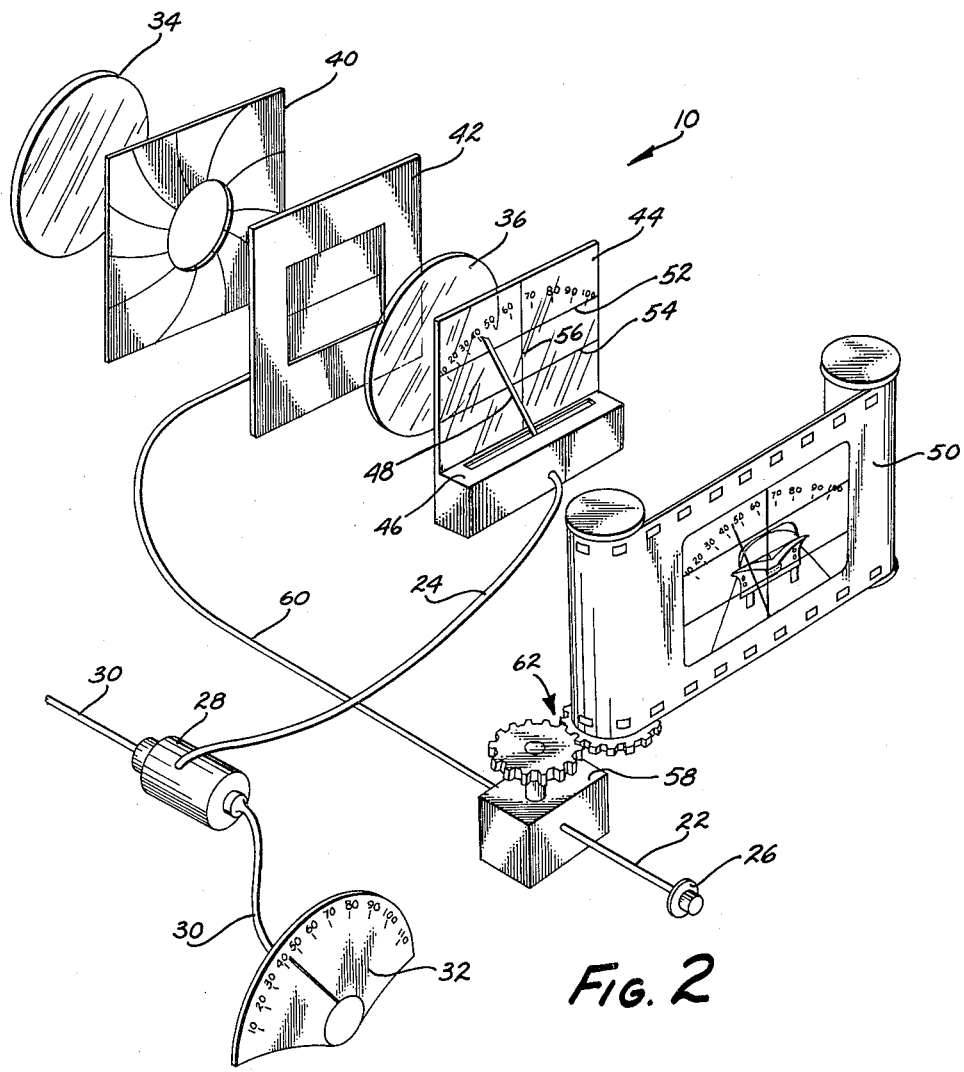
FIG. 2 is an exploded schematic view of the camera and related apparatus of this invention.

Referring now to FIG. 2 for the details of the system, it will be seen that camera 10 has an optical system consisting of lenses 34 and 36. It will be understood that the lenses 34, 36 are shown as a matter of example only, and that the optical system of the camera can be varied as dictated by optical requirements not material to this invention. A conventional iris 40 (which may be of the automatic, light-operated type) and shutter 42 are provided in the optical path of the camera 10. Interposed in the optical path of camera 10, e.g., immediately in front of film 50, is the substantially transparent scale 44 of a voltmeter 46. The voltmeter 46 is coupled by cable 24 to the generator 28. The generator 28 is mounted at a convenient place behind the dashboard of the car 14 and is connected in series with the speedometer cable 30 of the police car. The generator 28 is so constructed as to put out a voltage proportional to the speed of its armature, so that the voltage received by the voltmeter 46 over cable 24 is proportional to the velocity of the police car as indicated by the speedometer 32. The pointer 48 of the voltmeter 46 will consequently indicate the velocity of the police car 14 on the scale 44. The lens system and the position of the scale 44 must be so chosen that a sharp image of the scale 44 and of pointer 48 will be projected onto the film 50 whenever the shutter 42 is open.

The scale 44 may have etched thereon a grid of lines 52, 54, 56 which are projected onto the film 50 simultaneously with the image of the pointer 48 and scale 44, for a purpose hereinafter described.

A timer 58 actuated by the actuator button 26 through cable 22 operates the shutter 42 through shutter release 60 in such a manner as to take a predetermined number of pictures at accurately fixed time intervals each time it is actuated. The timer 58 also winds the film 50 between exposures through an appropriate gear train 62. The timer 58 may be of any conventional construction and may be powered by a spring or by electricity, as circumstances may make desirable.

Figure 4:
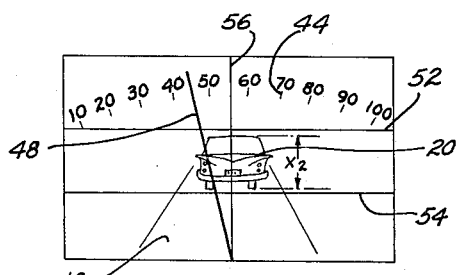
FIG. 4 is a like picture taken a known time interval later.
Figure 3:
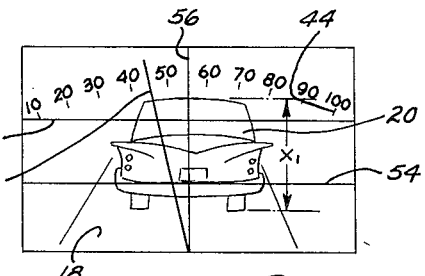
FIG. 3 is a schematic representation of a picture taken at a first instant of time.

When the operator depresses the actuator button 26, the camera 10 begins to snap a series of pictures such as those shown in FIGS. 3 and 4. As a matter of example, FIG. 3 may depict a picture taken at a certain instant of time, and FIG. 4 a picture taken a few seconds later. As will be seen from FIGS. 3 and 4, each picture shows the road 18 and the subject car 20, as well as the pointer 48, the scale 44, and the reference lines 52, 54, 56. The only difference between FIG. 3 and FIG. 4, it will be noted, is that the subject car 20 is larger in FIG. 3 than it is in FIG. 4.

Figure 5:
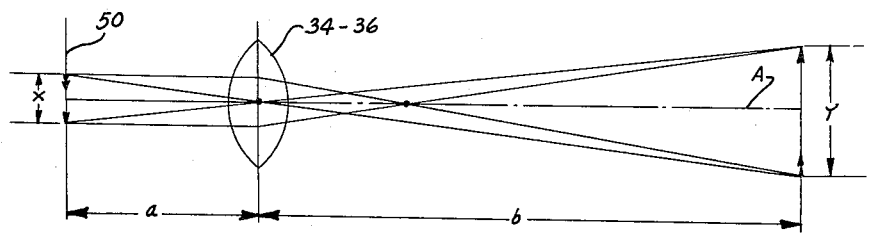
FIG. 5 is an optical diagram showing how the data gathered by the camera can be used to determine the speed of the photographed vehicle.

How these pictures can be used to determine the speed of the subject car 20 is best seen in FIG. 5. If $y$ designates the height of the subject car 20 and $x$ the height of the image of the subject car on film 50, then the relationship between $x$ and $y$ can be expressed by the formula $$\frac{x}{y} = \frac{a}{b} \qquad (1)$$

In this expression, $a$ and $y$ are constant and known, because $a$ depends on the construction of the camera and $y$ can be ascertained from the specifications of the manufacturer of the car being photographed. Since the quantity $x$ can be measured on the film 50 when it is developed, the only remaining unknown in the equation is the distance $b$ between the optical center of the lens system 34, 36 and the subject car 20. Equation 1 can therefore be solved to give $$b = \frac{ay}{x} \qquad (2)$$

Going back now to FIGS. 3 and 4, it will be seen that the height of the car 20 in FIGS. 3 and 4 has been designated by $x_1$ and $x_2$ respectively. By solving Equation 2 in FIGS. 3 and 4 for the respective camera-to-car distances $b_1$ and $b_2$, it is now possible to obtain the camera-to-car distances at two different moments separated by the known time interval $t$. The speed of subject car 20 with respect to the camera 10 can now be computed by the simple formula $$v = \frac{b_2 - b_1}{t} \qquad (3)$$

Formula 3 gives the average speed of the subject car 20 with respect to the camera during the time interval $t$. To this must be added the velocity of the police car as indicated by the pointer 48 on scale 44. Since the pictures of FIG. 3 and FIG. 4 are taken in comparatively quick succession, the velocity of the police car is likely to remain substantially constant during the interval $t$. If more than two pictures are taken in any one series, it will be possible to compute not only the average speed, but also the average acceleration of the subject car 20 by the use of well-known mathematical formulae.

It should be noted that regardless of any enlargements, the lines 52, 54 can always be made to indicate a definite comparison distance on the film 50. For example, the lines 52, 54 can be so arranged that their images on the film 50 will be spaced exactly one inch apart. In such a case, the picture may be enlarged to any convenient size, and yet it will be known that the image of a car 20 having a total height of twice the distance between lines 52 and 54 on the enlargement would have a total height of two inches on the film 50. The lines 52, 54, 56 serve yet another purpose by confirming that the subject car 20 is moving straight along the axis A of FIG. 5, thus obviating any errors resulting from non-parallel movement of the two cars. Obviously, it is possible to have a different grid arrangement than that of lines 52, 54, 56; in particular, the spaced lines may be vertical so that a horizontal dimension of the car can be measured for purposes of computation.

Although a particular embodiment of the invention has been described herein, it will be obvious that the invention can be carried out in many different ways. Also, the camera 10 may be equipped with various accessory devices for indicating the time of day, police car identification number, etc. It is therefore to be understood that the invention is not to be limited by the foregoing description, but only by the broadest scope of the following claims.

I claim:

1. A speed recording device comprising: a camera mounted in a vehicle, said camera being arranged to produce on a film a plurality of images of a moving object, means to produce said images at constant predetermined time intervals, and means in said camera for superimposing onto said images indicia representative of the velocity of said vehicle, said last-named means including a transparent scale positioned in the light path between said object and said film, said scale being of a size such that its image on said film extends across a major portion of the image of said object, and a velocity-indicating pointer movable across said scale in a position such that its image extends across the image of said object in normal operation.

2. A speed recording device comprising: a camera mounted in a first vehicle, said camera being arranged to produce on a film a plurality of images of a moving object, means to produce said images at constant predetermined time intervals in excess of about one second, means in said camera for superimposing onto said images indicia representative of the velocity of said vehicle, and measuring indicia producing means in said device to further superimpose upon each of the recorded images fixed indicia representative of a predetermined comparison dimension relating to the dimension of a second vehicle, whereby the speed of the second vehicle can be determined from the recorded images, the time intervals, and the speed of the first vehicle, even if the first vehicle is traveling at a different speed than the second vehicle.

3. A speed recording device comprising: a camera mounted in a first vehicle, said camera being arranged to produce on a film a plurality of images of a moving object at predetermined time intervals, a substantially transparent velocity indicator in the optical path between said object and said film, said velocity indicator being operationally connected to the speedometer of said vehicle, and measuring indicia producing means in said camera to superimpose upon each of the recorded images fixed indicia representative of a predetermined comparison dimension relating to the dimension of a second vehicle, whereby the speed of the second vehicle can be determined from the recorded images, the time intervals, and the speed of the first vehicle, even if the first vehicle is traveling at a different speed than the second vehicle.

4. The device of claim 3 in which said last-named means are a pair of spaced opaque lines mounted in said optical path.

5. The device of claim 4, said last-named means further including a vertical opaque line for indicating the center of the field of said camera, said first-named pair of opaque lines being horizontal.

6. A speed recording device comprising: a camera mounted in a vehicle, said camera being arranged to produce on a film a plurality of images of a moving object, means to produce said images at constant predetermined time intervals in excess of one second, and means in said camera for superimposing onto said images of said object indicia representative of the velocity of said vehicle, said velocity indicia being produced by an electrical potential measuring device mounted in said camera and having a transparent scale whose image extends generally across the entire width of each photographic frame, an electrical generator connected to the speedometer of said vehicle in such a manner as to produce an electrical potential proportional to the velocity of said vehicle, and means connecting said measuring device to said generator to measure said electrical potential.

References Cited in the file of this patent

UNITED STATES PATENTS

| | | |
|---|---|---|
| 1,895,211 | Short | Jan. 24, 1933 |
| 2,148,119 | Grist | Feb. 21, 1939 |
| 2,250,442 | Abell | July 29, 1941 |
| 2,521,667 | Neyhart | Sept. 5, 1950 |
| 2,742,834 | Kondolf | Apr. 24, 1956 |
| 3,032,766 | Weaver | May 1, 1962 |

FOREIGN PATENTS

| | | |
|---|---|---|
| 1,054,757 | Germany | Apr. 9, 1959 |